United States Patent

Lee

[11] 3,913,763
[45] Oct. 21, 1975

[54] COLLAPSIBLE DOLLY MOVING SYSTEM

[75] Inventor: William Smith Lee, New Orleans, La.

[73] Assignee: Lee Inventions, Inc., New Orleans, La.

[22] Filed: Apr. 16, 1974

[21] Appl. No.: 461,290

Related U.S. Application Data

[60] Division of Ser. No. 216,597, Jan. 10, 1972, Pat. No. 3,804,275, which is a continuation-in-part of Ser. No. 9,223, Feb. 6, 1970, Pat. No. 3,633,774.

[52] U.S. Cl. ............................ 214/505; 214/152
[51] Int. Cl.² ........................................ B60P 1/30
[58] Field of Search ....... 214/505, 152; 280/6, 6.11, 280/6.1

[56] References Cited
UNITED STATES PATENTS

| | | | |
|---|---|---|---|
| 1,537,457 | 5/1925 | Bryan | 214/505 |
| 2,595,474 | 5/1952 | Marvin | 214/505 X |
| 3,689,090 | 9/1972 | Dunaevsky et al. | 280/6.1 |

Primary Examiner—Robert G. Sheridan
Attorney, Agent, or Firm—Pugh & Laiche

[57] ABSTRACT

A stair climber moving system (FIGS. 1–2) for moving a load up flights of stairs (FIGS. 9A–9H) which includes a basic tractor unit, a load mounting platform attached to the tractor which allows the load to be shifted longitudinally with respect to the tractor during use (FIGS. 5A, 5B, 9F), an intergrated winch system for changing the position of the load with respect to the tractor unit (FIGS. 7–7A), and a collapsible dolly (FIGS. 6A–6D) permitting load changes from horizontal (6B) and inclined (6D) positions.

The collapsible dolly is the subject of this application and includes a fixed horizontal bottom platform supported by five sets of caster wheels. A collapsible load bearing platform is mounted and supported on the fixed bottom platform by a fixed center vertical strut member through a hinge connection. At opposed ends of the collapsible load bearing platform are auxiliary, end, support members, one fixed and the other collapsible, the latter of which is spring biased in a normally vertical, supporting disposition. The load bearing platform is collapsible, i.e. put in an inclined disposition by means of moving said collapsible auxiliary end support out against the force of the spring, allowing the load bearing platform to rotate about its hinged connection.

Having the dolly change from an inclined to a horizontal disposition minimizes the total horizontal, longitudinal dimension of the system which is particularly useful in very tight quarters such as occur on stair landings (cf. FIGS. 9G and 9H). Having a load-shifting capability during use permits precise balancing of the system as needed throughout the movement of the load up the stairs.

10 Claims, 26 Drawing Figures

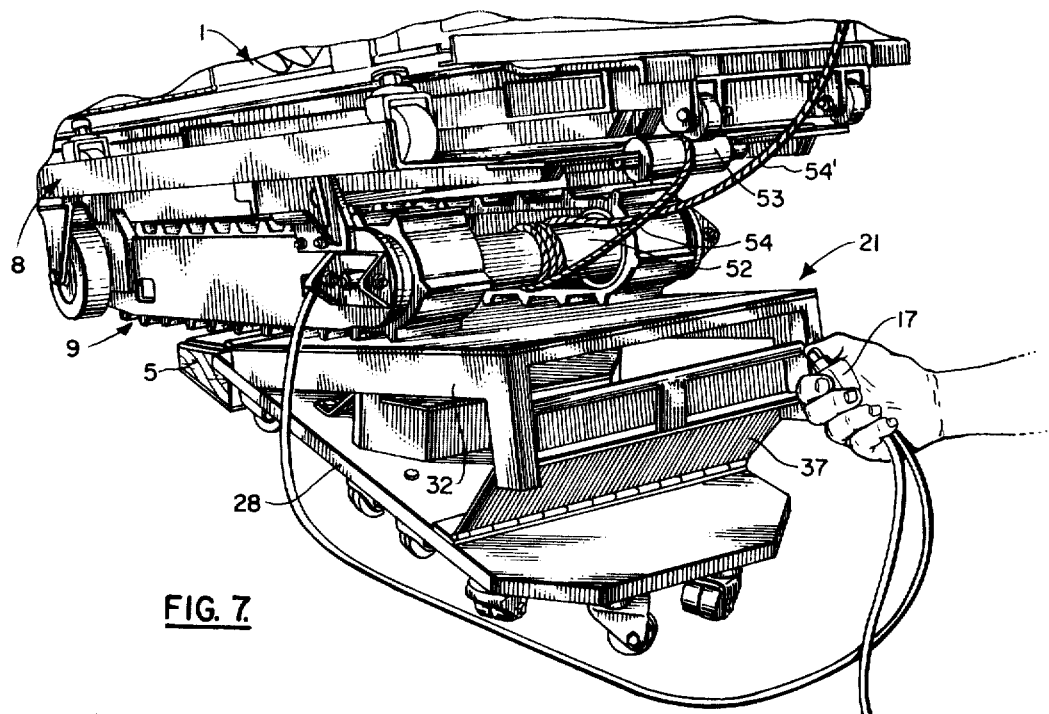
FIG. 7.
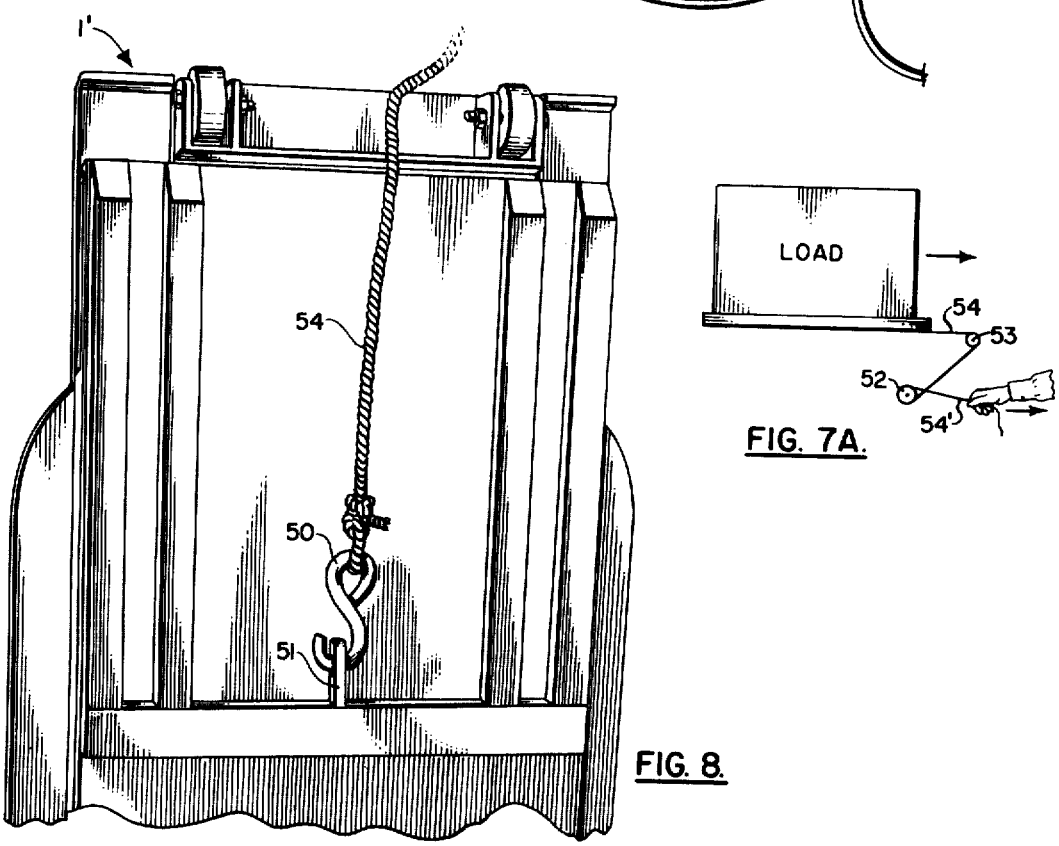
FIG. 7A.
FIG. 8.

COLLAPSIBLE DOLLY MOVING SYSTEM

REFERENCE TO RELATED APPLICATIONS

This application is a division of application Ser. No. 216,597, filed Jan. 10, 1972, entitled "Stair Climber Moving Method," now U.S. Pat. No. 3,804,275 being issued on Apr. 16, 1974, which is a continuation-in-part of application Ser. No. 9,223, filed Feb. 6,1970, entitled "Moving System," now U.S. Pat. No. 3,633,774, issued on Jan. 11, 1972.

BACKGROUND OF THE INVENTION

The present invention relates to an improved collapsible dolly system which can be for example used for assistance in moving a loaded stair climber around a horizontal stair landing, particularly one which is in tight quarters, the load bearing platform of the dolly being changeable from horizontal to inclined dispositions.

Powered stair climbing, load carrying tractors per se are, of course, old in the art as seen, for example, in U.S. Pat. No. 3,512,658, issued May 19, 1970 to a Mr. Verle M. Harlan. Indeed, for illustrative purposes only, the present invention will be described as applied to and for use with a basic "Harlan" tractor similar to the embodiment of FIG. 4 of the Harlan patent; although, of course, the present invention is equally applicable to all types of power operated, load carrying, stair climbing devices as well as to other kinds of moving systems besides stair climbing ones.

Although these stair climbing devices are well known in the prior art, their use has left a lot to be desired, particularly when the load to be carried was very heavy, bulky and difficult to handle.

A very difficult problem that has been encountered with prior art stair climbing devices was the transferring of the loaded stair climber from one flight of stairs, across a landing and onto a second flight of stairs. Herein problems arose because of the tight quarters found on many stair landings wherein mere inches of clearance are very critical.

Thus, the prior art enabled movers to move the heavy machinery up a flight of stairs with ease but, upon reaching the landing, were still faced with the tugging and pushing and jolting of the loaded stair climber in order to manipulate it around the landing and up the next flight of stairs. This prior art method of transgressing the landing has made the advantage of the stair climber usually ineffective with regards to labor savings, in that three or more laborers would still be needed to manipulate the loaded stair climber on the landing. Even then, there would also be the sustained shock to the load during the manual handling thereof which may have been the very problem the stair climber was used to avoid.

A basic object of the present invention is inter alia to overcome this prior art problem found in the moving of heavy, bulky loads up flights of stairs in a relatively simple, straight forward and reliable manner; and to solve this prior art problem without the need for any additional complex or particularly sophisticated devices, allowing the use of the present invention by the relatively unskilled working personnel used in the moving industry.

The present invention achieves this goal by providing a relatively simple collapsible dolly system wherein the total horizontal, longitudinal dimension of the overall loaded moving system is minimized in tight quarters by the use of a collapsible dolly having both inclined and horizontal positions.

BRIEF DESCRIPTION OF THE DRAWINGS

FIG. 5A is a top plan view of the loaded system, while

FIG. 7 is a front, perspective, fragmentary view of the loaded tractor unit being driven up on the collapsible, inclined dolly and showing the front elements of the winch system for altering the position of the load, while FIG. 7A is a schematic side view of the working elements of the winch system;

FIG. 8 is a bottom view of the load platform sled showing the end connection of the winch rope to the load platform;

DESCRIPTION OF THE PREFERRED EMBODIMENT

Introduction

Figure 1:
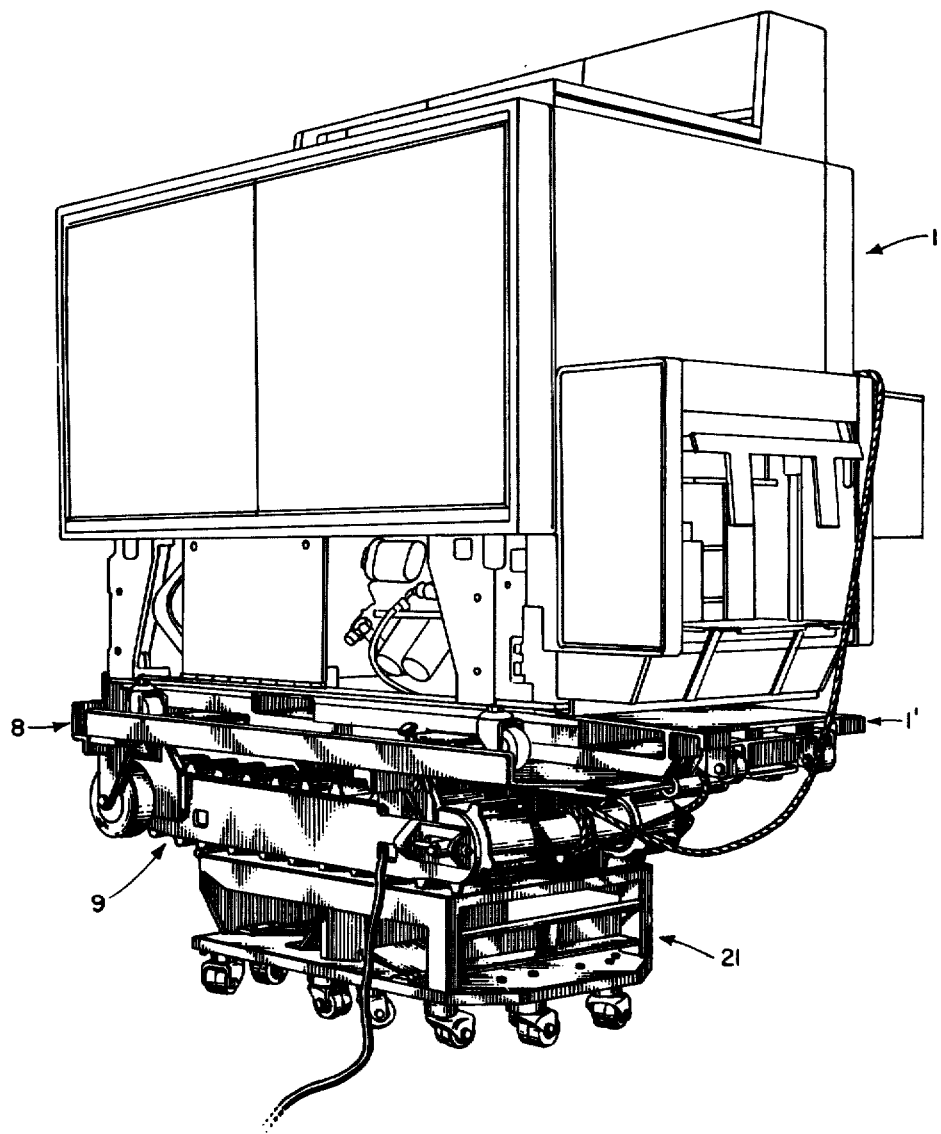
FIG. 1 is a perspective view of the total loaded moving system of the present invention, having a "XEROX" 2400 series unit as a load and with the collapsible dolly in its horizontal position.
Figure 2:
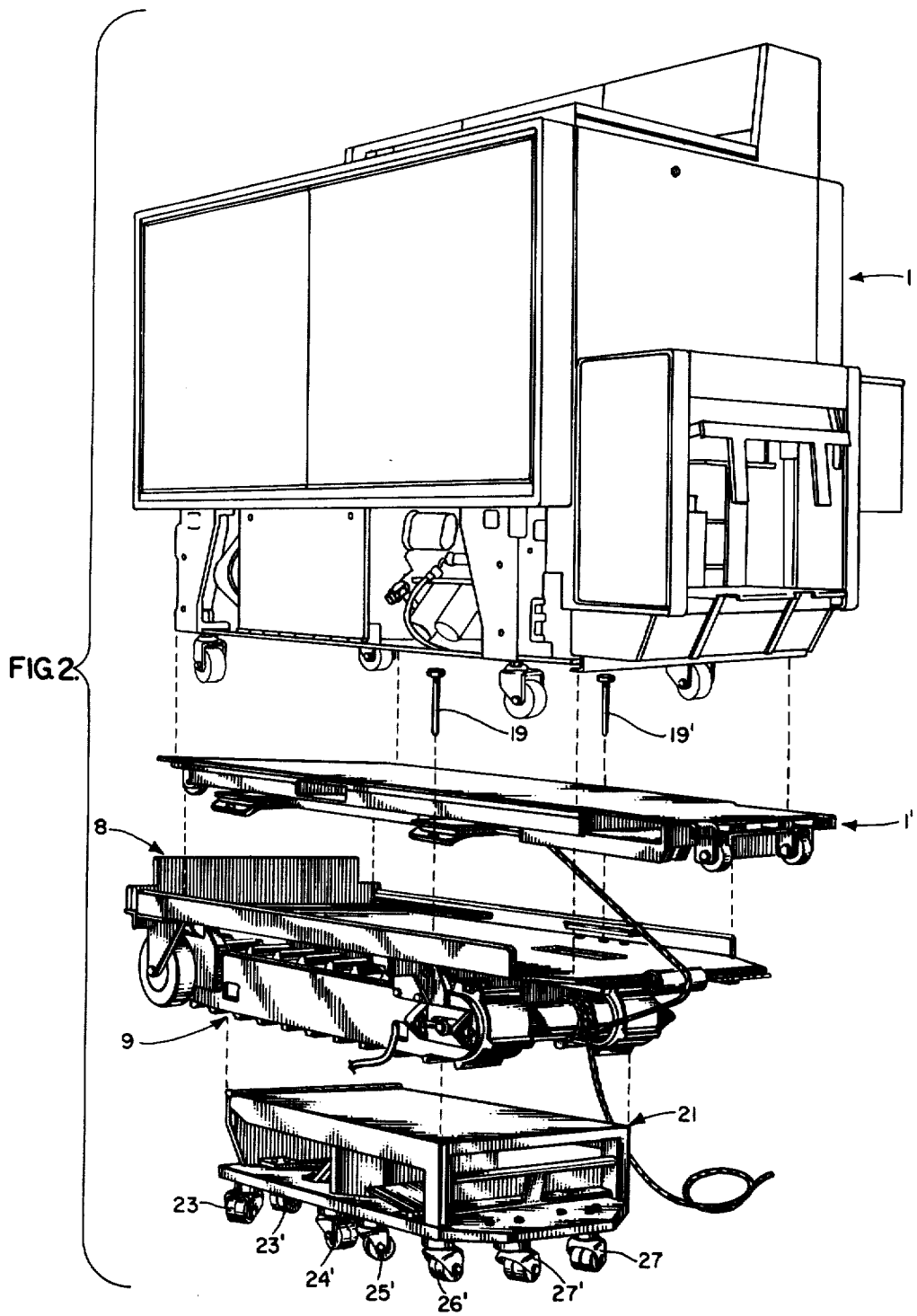
FIG. 2 is an exploded, perspective view of the loaded moving system of FIG. 1 with the elements "exploded" apart.

The preferred embodiment of the collapsible dolly of the present invention can be used for example as part of an over-all moving system for moving a heavy, bulky load up a series of stairs which, as shown in FIGS. 1 and 2, includes primarily a stair climber basic tractor unit 9 with a special slotted loading platform 8 attached thereto, a load sled base unit 1', similar to that disclosed in the prior parent application Ser. No. 9,223 (U.S. Pat. No. 3,633,774) but with special flange adapters 67, and the collapsible dolly 32 which forms the preferred embodiment of the present invention. Built into the tractor unit and utilizing the slidable mating relationship between the load 1 and the tractor unit 9 is a winch system (FIGS. 7–8) for altering the position of load 1 with respect to the tractor unit 9 for changing the center of gravity of the loaded moving system which forms the primary subject matter of the copending parent application Ser. No. 216,597 (U.S. Pat. No. 3,804,275). The preferred embodiment of the collapsible dolly of the present invention itself is best seen in its structural details in FIGS. 6A–6D.

For illustrative purposes only, the preferred embodiment of the collapsible dolly of the present invention will be described in association with a typical situation encountered in the field and how the over-all moving system is used in such a situation. However, the collapsible dolly of the present invention can of course be used in many other systems and for many other purposes where it is desirable to change the load disposition from horizontal to inclined and vice versa.

For exemplary purposes, it will be assumed that a mover is faced with moving a heavy, bulky load up at least two flights of stairs with a landing therebetween; that is, with a horizontal platform upon which one flight of stairs ends and the other flight of stairs begins. Additionally, for purposes of illustration only, the over-all moving system will be described as applied to the moving of a "XEROX" duplication machine of the 2400 family, but it is, of course, applicable to the moving of heavy equipment or loads upstairs generally, particularly loads which are large, bulky and difficult to handle.

Finally, for purposes of illustration only, it will be assumed that the load 1 is a combined load having a base sled 1' attached thereto. The method and means of attaching the base sled 1' is disclosed in and is the subject of the first parent application Ser. No. 9,223 (U.S. Pat. No. 3,633,774). Additionally, the method and detailed means of mounting the sledded load onto the stair crawler and moving the sledded load by an internal winching system with respect to the crawler is disclosed in and is in part the subject matter of the second parent, copending application Ser. No. 216,597 (U.S. Pat. No. 3,804,275). For the sake of brevity, the full disclosures of both applications/patents will not be repeated here and, instead, their entire disclosures are hereby bodily incorporated herein for the fullest understanding and appreciation of the present invention. However, it should be realized that the present invention is not restricted to use with the moving systems of those application/patents but is adaptable to many other types of loads and systems.

Figure 3A:
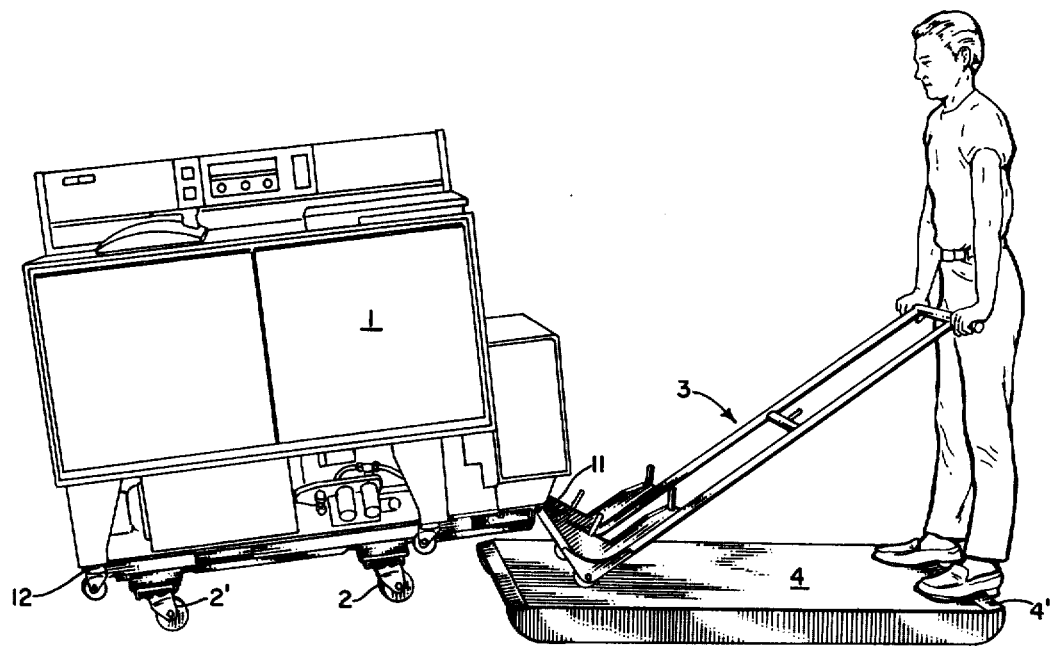
FIGS. 3A–4C are perspective side views, some fragmentary, showing the steps in mounting the machine or load on the tractor unit utilizing the system of the present invention.
Figure 3B:
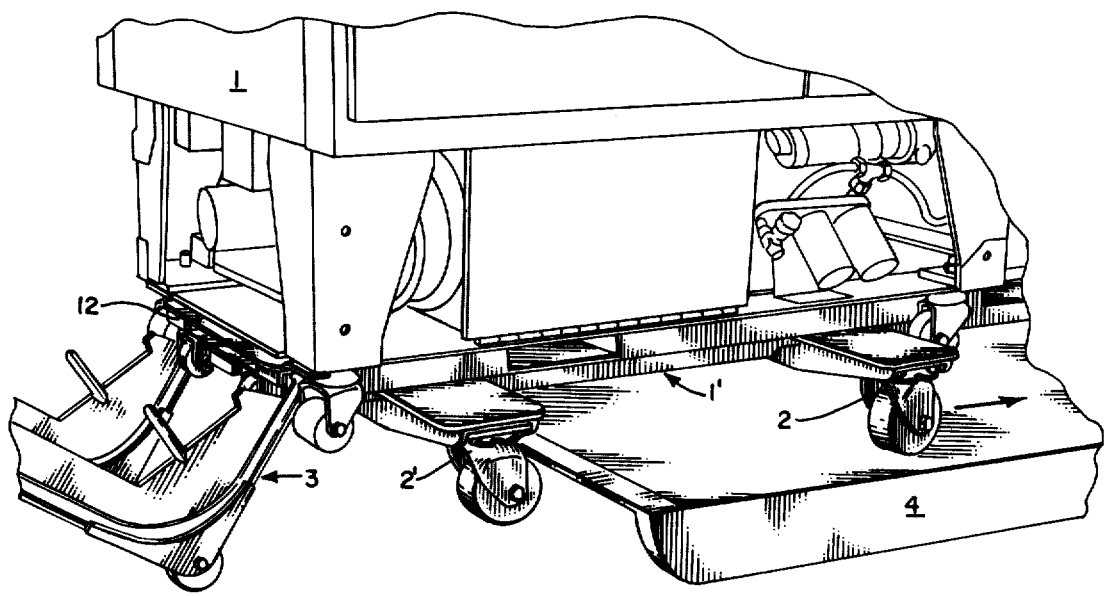
Figure 4A:
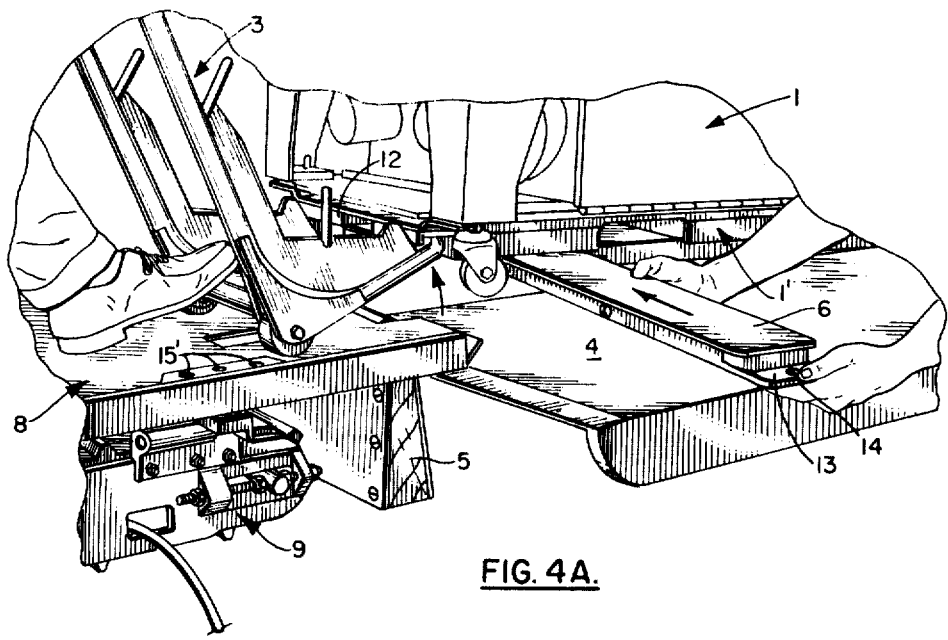
Figure 4B:
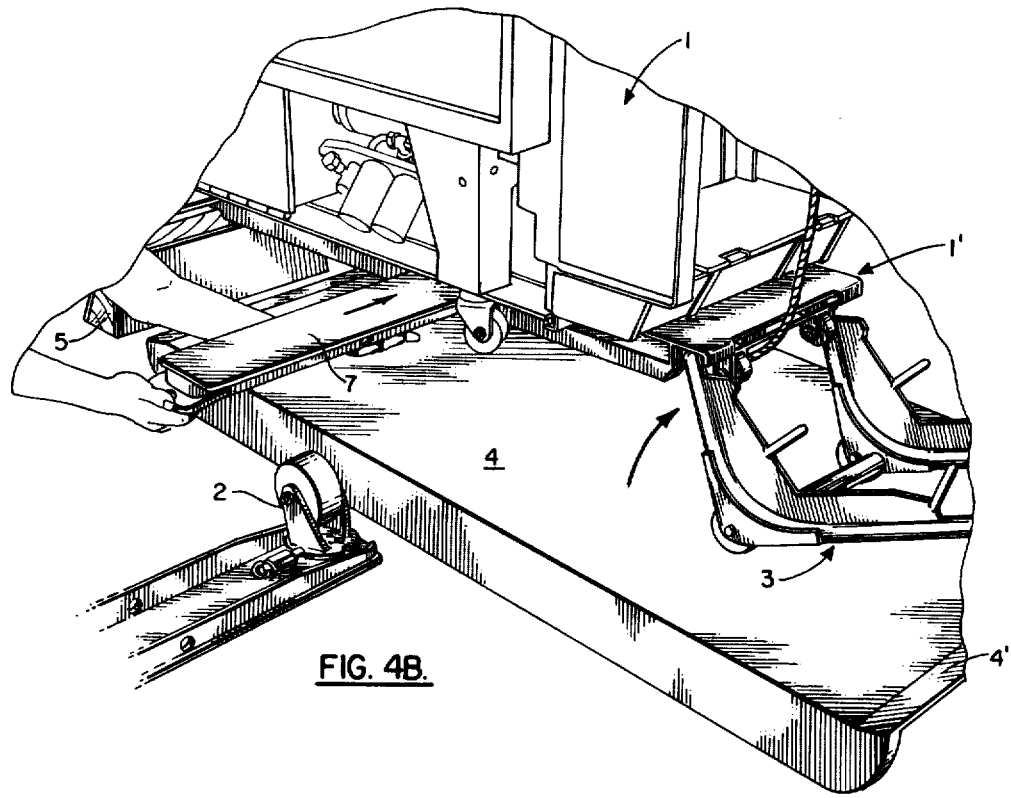
Figure 4C:
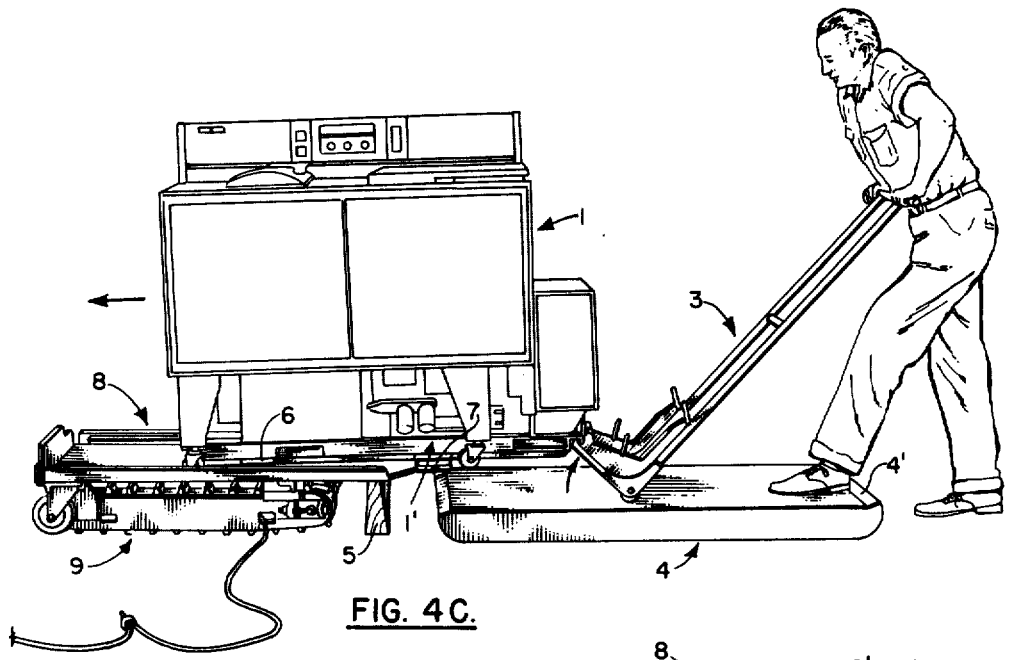
Figure 5A:
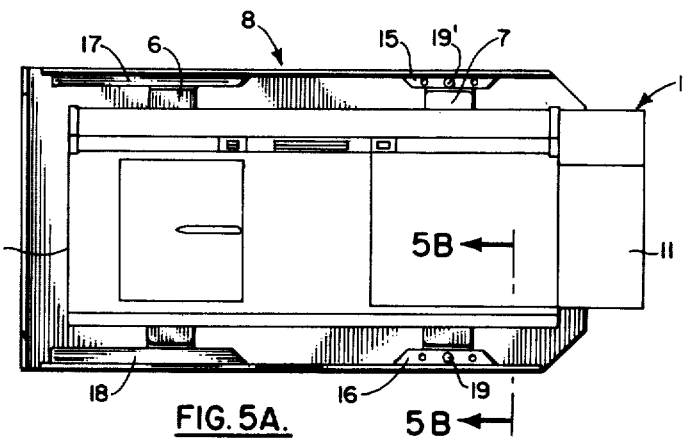
Figure 5B:
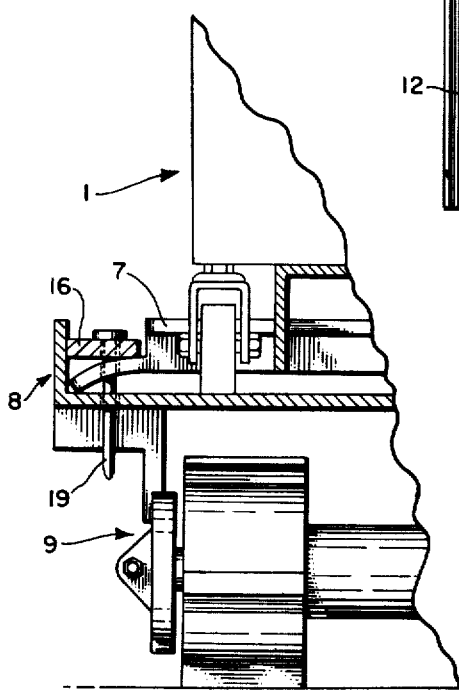
FIG. 5B is a front, fragmentary cross-sectional view along section lines 5B—5B of FIG. 5A, both showing the sliding, mating relationship between the side flanges and slots of the load platform and the tractor platform, respectively.

The completely loaded over-all moving system, including the load 1, the sled 1', the load platform 8, the crawler 9, and the collapsible dolly 21, is shown in FIGS. 1 and 2, the latter in exploded array. The initial sequence of loading steps using an interim platform 4 and a lever jacking handle 3 is shown in FIGS. 3A and 3B; while the final sequence of loading steps is shown in FIGS. 4A–4C using a wedge member 5 and special "caster" adapter elements 6 and 7. The means of fastening the sledded load 1—1' to the load platform 8 of the crawler 9 with locking pins 19, 19' and cooperating flanges 13 and slots 15–18 is shown in FIGS. 5A and 5B. The details of these steps and structures are more fully described in the parent, copending application Ser. No. 216,597 (U.S. Pat. No. 3,804,275).

The tractor unit 9 is more fully described in the Harlan U.S. Pat. (3,512,658) and reference is made thereto. Likewise, the basic technique of traversing stairs with the use of a fixed (non-collapsible) inclined dolly discussed in the Harlan patent is generally pertinent here. However, for the sake of brevity, the pertinent disclosures of the Harlan patent will not be repeated in detail, but instead the entire disclosure thereof is hereby bodily incorporated herein for the fullest understanding and appreciation of the present invention. Thus, in the following discussion of the stair climbing technique, emphasis will be placed more on the differences and modifications taught by the present invention.

Also, again in the interest of brevity, the structural make-up of the various elements of the present invention will not be discussed in great detail, but only generally alluded to throughout this specification, because these structural details are clearly shown and fully disclosed in the highly detailed drawings presented herewith. Full reference thereto is hereby made.

STAIR CLIMBER TECHNIQUE

Now that the load, for example, the Xerox 2400 unit 1 is mounted atop the stair climber tractor unit 8–9, the operation of moving the loaded system from the horizontal ground level surface up and over the first flight of stairs will be described. In order to accomplish the move, three additional pieces of equipment will come into action, namely, the wedge block 5 which was used to support the end of the load platform 8 during loading, the collapsible dolly 21 and a bridging element 22. These additional units are best shown in use, for example, in FIGS. 7 and 9A, wherein they are used to allow the loaded stair climber to begin its movement from the horizontal ground level to the initial steps of the first series of stairs.

The wedge block 5 is simply a wedge that allows the stair climber to gradually start its upward climb to the stairs. The wedge block 5 is placed in front of the collapsible dolly 21 as illustrated best in FIG. 7.

DOLLY STRUCTURE

As shown in FIGS. 6A–D, the collapsible dolly, to which the present invention is directed, comprises a fixed horizontal bottom platform 28 onto which five sets of caster wheels 23–27 are located, and disposed all across the bottom as needed and desired in view of the load to be carried. Because the overall load is placed on the dolly 21 at different points and in different dispositions, a large number of casters are usually needed.

The center strut member 31 is the support upon which the collapsible platform 32 is hinged at its center. The end support member 34 at end 29 of the collapsible dolly is hinged to the collapsible platform 32 at hinge 35. The end support member 34 is held in its raised, supporting position by spring 33 which is attached at one end to the end support 34 and at the other to the horizontal bottom platform 28. The spring 33 holds the end support member 34 in the vertical position against abutment 36 which is fixedly attached to the horizontal bottom platform 28. With end support 34 in its spring biased raised position, the loadbearing form 32 is parallel to the platform 28, as illustrated in FIG. 6B.

In order to collapse the dolly from a horizontal to an inclined position, the end support member 34 is moved from the perpendicular position to platform 32 to an angular position with respect to platform 32. At the same time, the end 29 of the platform 32 is lowered so that it comes into contact with the horizontal platform 28, producing an inclined surface (note FIG. 6D). To lock and secure the dolly 21 in its inclined position, a locking and support member 37 located towards the end 30 of the collapsible dolly is swung up into position at hinge 38 and interlocks into a lip lock 39 located on the inside of the support member 42 of the collapsible platform 32.

Figure 6A:
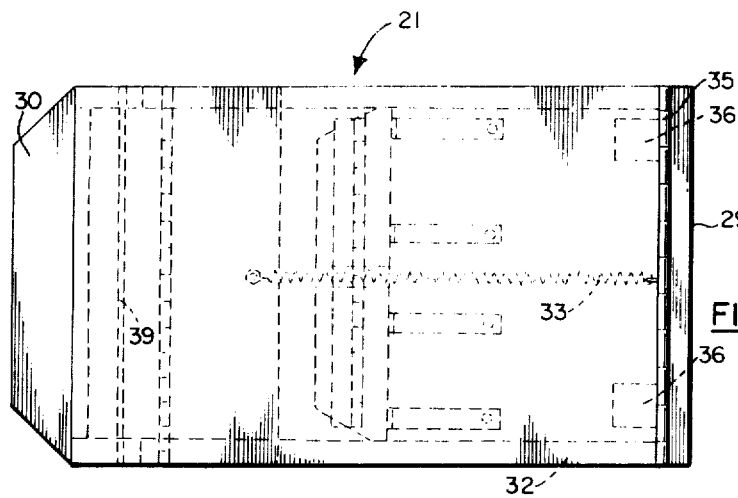
FIGS. 6A–6C are top, side and front views of the collapsible dolly of the present invention in its collapsed or horizontal position, with its inner, hidden structural elements in phantom lines.
Figure 6B:
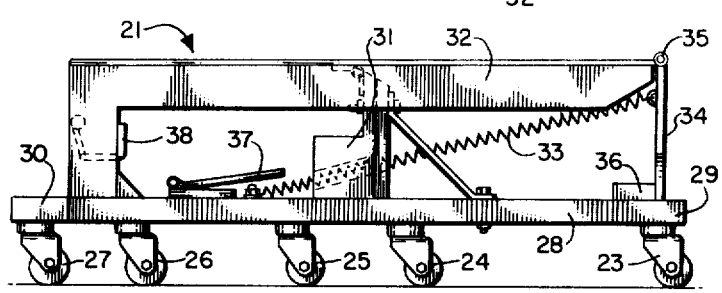
Figure 6C:
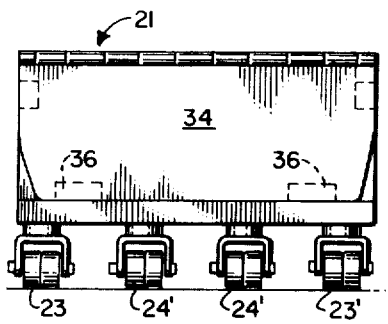
Figure 6D:
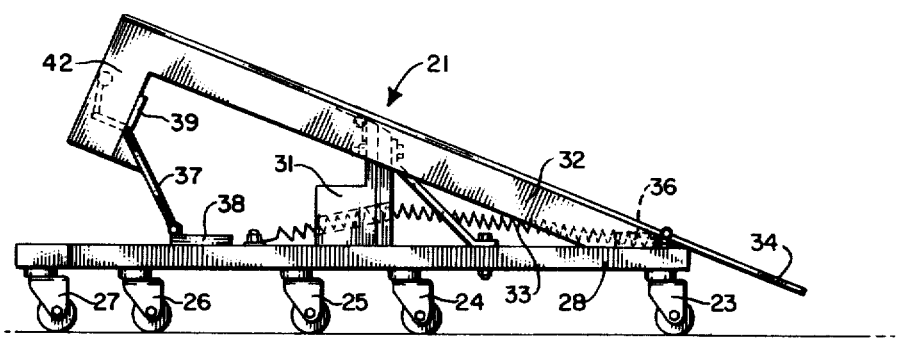
FIG. 6D is a side view of the collapsible dolly in the upright or inclined position, again with its inner, hidden structural elements shown in phantom lines.

To return the dolly 21 to its horizontal position, upward pressure is applied to the member 42 at end 30, releasing hinged locking plate 37, the latter then being returned to its inoperative position (as shown in FIG. 6B). Applying downward pressure to the member 42 causes the platform 32 to return to a horizontal disposition while spring 33 pulls hinged locking plate 34 back into its raised, locking position shown in FIG. 6B.

The bridge member 22, as shown in FIGS. 9A–9D, consists of a rigid rectangular element designed to sustain a load while only being supported at each end. In use, the forward end is supported on the stairs, while the rear end is supported on the member 41 attached to the vertical support member 42 of the tiltable platform 32 (note FIG. 10). The interlock here consists of a circular trough 40 within the end of the bridging member 22 that interlocks with a horizontally disposed rounded member 41 attached to the vertical support member 42. This interlock between the half-round trough 40 and the circular dowel 41 gives excellent resistance to the forward and backward motion that may be caused due to the stair crawler moving from the vertical platform 32 to the bridging platform 22.

Figure 9A:
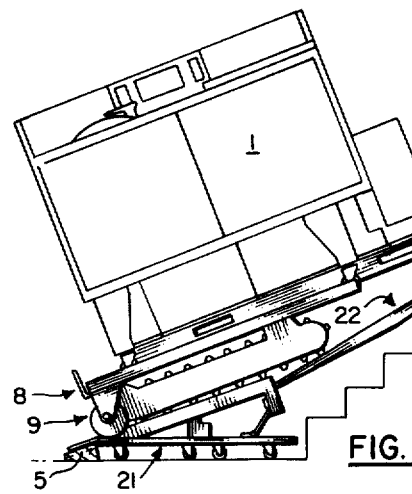
FIGS. 9A–9H are side views of the moving system of the present invention being driven up a flight of stairs and onto an intermediate stair landing, each figure showing a different stage of the move.
Figure 9B:
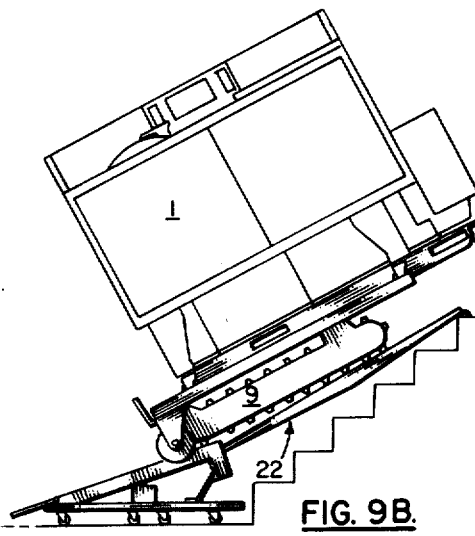
Figure 9C:
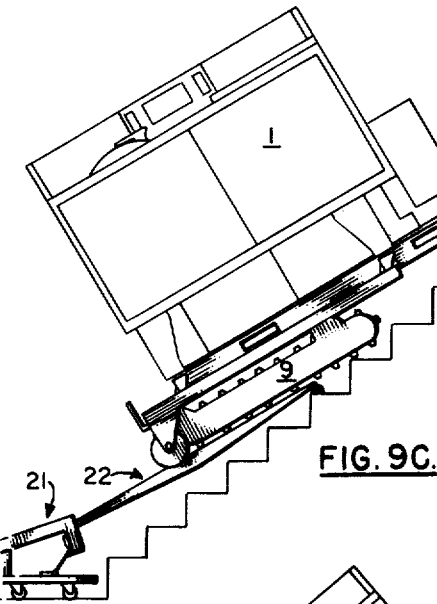
Figure 9D:
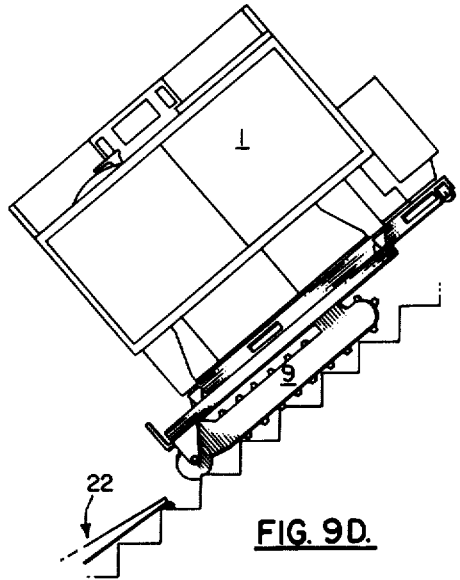
Figure 9E:
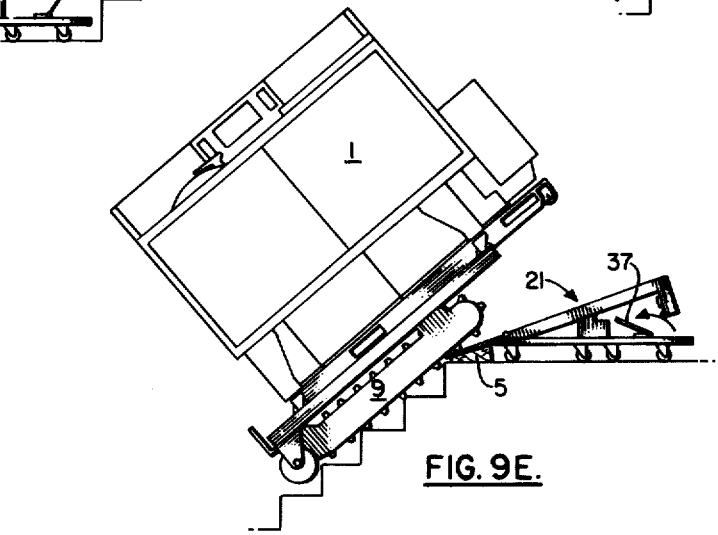
Figure 10:
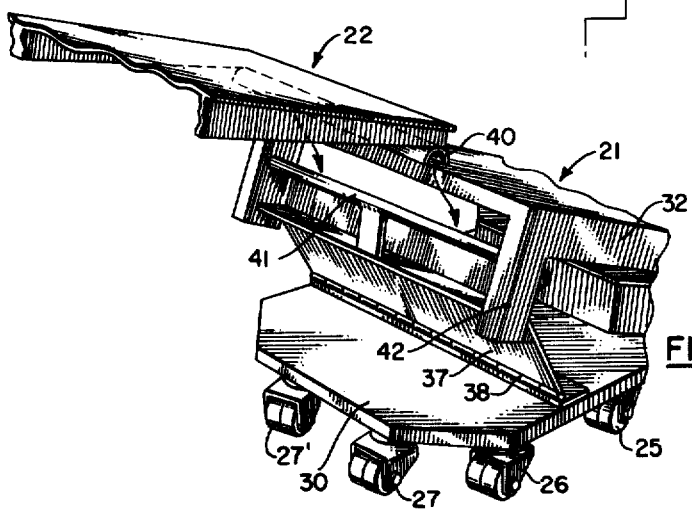
FIG. 10 is a fragmentary, perspective view showing the attachment of a bridging element to the front edge of the collapsible dolly when the loaded tractor unit is to begin transversing a flight of stairs, as shown in FIGS. 9A–9C.

With the wedge block 5 in position, as shown in FIG. 7, the tiltable or collapsible dolly tilted and in position, as shown in FIG. 9A, and the bridging member 22 positioned from the collapsible dolly to the stairs, also illustrated in FIG. 9A, the loaded stair climber can now ascend from the horizontal surface up the stairs.

By activating the electric motor power switch 17 (FIG. 7), the tractor unit of the loaded stair climber is caused to begin traveling up onto the inclined dolly 21, then up and across the bridging member 22 and up the flight of stairs (FIGS. 9A–9E).

During its traverse, it is often desirable and sometimes even necessary to alter the center of gravity of the loaded stair climber in order to make it easier to handle or to prevent it from tumbling back over onto itself and down the stairs. Changing of the center of gravity is accomplished by an internal winch system the structure and operation of which is best shown in the parent, copending application Ser. No. 216,597 (U.S. Pat. No. 3,804,275) and reference is made thereto.

As seen in FIGS. 9E–9H, after moving up the stairs, the next movement of the stair climber will be to go from the inclined stairs to a horizontal surface.

There are two possibilities. First, the horizontal platform could be a middle landing so that the landing must be crossed over to then proceed up a second flight of stairs. In such a case, the block wedge 5, collapsible dolly 21 and the bridge member 22 would be used again as before, after the system has been properly aligned and the landing crossed.

On the other hand, if the mover has reached the top of the stairs to which the load is to be transported, the only change that need be taken at this point is to change the center of gravity back down to its preferred position when horizontal so that, when the climber reaches the top step, the moving system will not have a tendency to fall forward onto the horizontal surface. Of course, the center of gravity should then be changed as previously described.

Figure 9F:
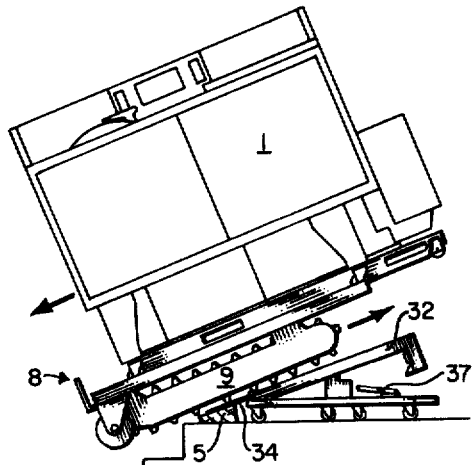
Figure 9G:
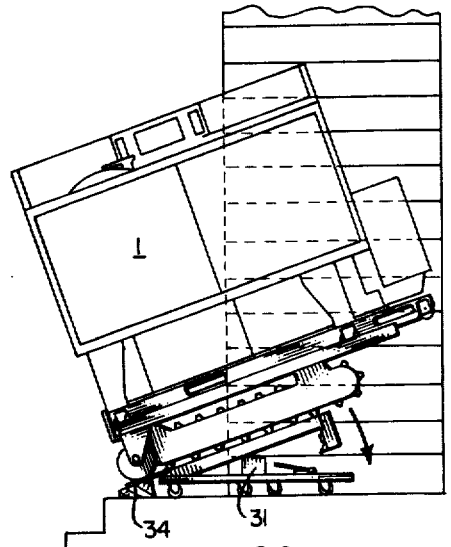

However, for the purpose of further illustration and discussion of the invention, it will be assumed that the horizontal surface is a landing which must be transgressed to get to a second flight of stairs and that the second flight is at ninety degrees to the first (note FIGS. 9G and H), requiring the rotation of the system by ninety degrees. The transgressing of such a landing is illustrated in FIGS. 9F–H. The wedge block 5 is placed at the top of the last step and the collapsible dolly 21 in its inclined position positioned behind the block 5. As the stair climber proceeds up the block 5 and onto the collapsible or inclined dolly 21, the load should be positioned to its rearmost position with respect to the tractor unit 9, thereby positioning the center of gravity more to the rear of the tractor unit 9. The change in the center of gravity is done in anticipation of bringing the loaded stair climber back to the horizontal position when it is sitting on the dolly 21. As the stair climber 9 moves up on the dolly 21, its weight will cause the tiltable platform 32 to move into its horizontal position, the locking plate 37 having been moved aside. At the same time, the spring biased support member 34 is pulled into its vertical position by the spring 33 until it is stopped by the abutment 36, locking the dolly 21 in its horizontal disposition. At this point, the loaded stair climber is not atop the collapsible dolly and in a horizontal position.

In the horizontal position and with the load moved all the way back with respect to its platform 8, the ninety degree rotation of the unit on the landing will take less room and less space, thereby allowing movement of much larger loads through smaller spaces or landings than have been accomplished before.

Figure 9I:
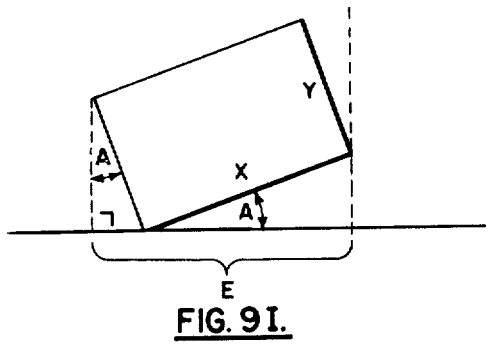
FIG. 9I is a schematic, geometrical figure illustrating the difference in the total horizontal, longitudinal dimension between the system being in an inclined position and a horizontal one.
Figure 9H:
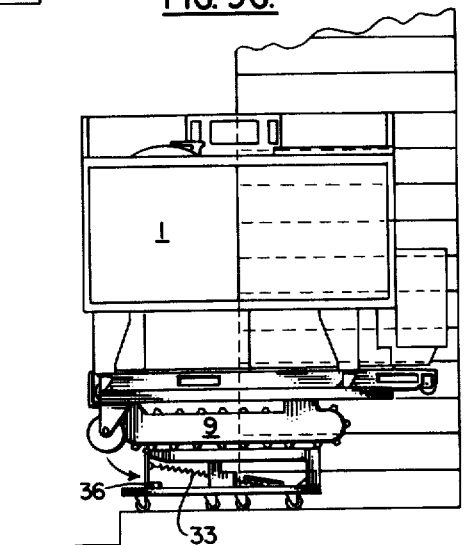

The amount of space savings achieved by being able to change from an inclined to a horizontal disposition can be seen by considering FIG. 9I. If $X$ and $Y$ are the longitudinal and vertical dimensions of the load or machine 1, and $A$ is the angle of inclination of the dolly, then the effective horizontal, longitudinal dimension $E$ by basic geometry is seen to be :

$$E = Y \sin A + X \cos A.$$

Typical dimensions encountered, for example, in the movement of a "Xerox" 2400 family machine is $X=60''$, $Y=45''$ and $A = 45°$. It is thus seen that in such a situation $E$ is approximately 73.5 inches long or 13.5 inches longer than $X$. Although just a matter of inches, this amount (in excess of a foot) is often the difference between being able to use a stair climber and being forced to manually carry the machine up the stairs with a crew of men, the latter "alternative" almost being a guarantee of damage to the machine.

After the loaded stair climber is effectively shortened by being moved to a horizontal position (FIG. 9H), it is rotated 90° so it can then face the next flight of stairs (shown in the background of FIGS. 9G and 9H). Once the rotation is complete and the unit is in position to start ascending to the next flight of stairs, the spring-biased element 34 can be moved into its angular, non-locking position with the tiltable platform 32 and the dolly 21 again inclined. The bridging element 22 is put in position from its horizontal support member 42 on the opposite end of the dolly and the other end of the bridging member 22 mounted on the next flight of stairs.

The stair climber is again actuated and the ascending of the next flight of stairs is accomplished. It should be noted, though, that as the angle increases in moving from the dolly to the bridge to the stairs, the center of gravity of the unit should be shifted with respect to the load platform 8 by using the winch mechanism 52, as described in the parent, copending application, and repositioning the pins 19 and 19' in the furthermost holes of the flanges 15, 16.

The final step is the unloading of the machine 1. Once the top step on the last flight of stairs is reached, the center of gravity of the combined load 1, 1' is shifted to the rearmost position with respect to the load platform 8, allowing the stair climber to gradually fall to a horizontal disposition. The stair climber is then driven to the desired location of the "XEROX" machine, or other load, within the building.

The unloading of the machine 1 from the tractor unit and then from the sled 1' is accomplished by reversing the steps followed in loading the machine.

It should be noted that the stair climber is very slow. Thus, if any distance is still involved once the proper level is reached, the combined sled/machine 1,1' can be placed on the dual set of caster wheel elements 2,2' for speed in transporting the unit to its desired location.

As is true with most mechanical systems, many variations in structure and use within the present invention are possible. For example, although a precise centering of the central support member 31 is preferred some variation in position is possible. Thus nearly unlimited variations, alterations and changes in the design and detail of the preferred embodiment are possible within the scope of the present invention. In addition to those exemplary changes discussed above, there are, of course, many other ways in which the present invention may be practiced.

Because many varying and difference embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A collapsible dolly for transporting loads comprising:

a first, bottom platform structure;
   a number of caster wheels upon which said first platform structure is mounted, said caster wheels being disposed across the bottom thereof;
   a central support member mounted on said first platform structure and extending upwardly therefrom; and
   a second upper, load platform structure pivotally mounted on said central support member above and removed from said bottom platform structure;
   a first end support means located on one side of said central support member for supporting one end of said upper load platform structure on said bottom platform structure; and
   a second end support means located on the other side of said central support member for supporting the other end of said upper, load platform structure on said bottom platform structure; at least one of said end support means being moveably affixed to one of said platform structures allowing the end support means to be moved from an at least generally vertical, supporting disposition to a non-supporting position; whereby a load mounted on the dolly can be easily changed from an at least generally horizontal to an inclined disposition or vice-versa by rotating the load platform structure about the central support.

2. The dolly of claim 1 wherein the moveably affixed end support means is hingedly attached to said upper, load platform and extends downwardly therefrom to said bottom platform structure.

3. The dolly of claim 2 wherein there is further included:

an abutment stop on the upper side of said bottom platform structure positioned on the central side of said moveably affixed end support means; and
   elastic means attached to said moveably affixed end support means for biasing it toward said stop and against said stop when said moveably affixed end support means is in its at least generally vertical supporting position.

4. The dolly of claim 2 wherein said moveably affixed end support means extends down below and against the edge of said bottom platform structure in juxtaposition to the surface upon which said caster wheels rest when said moveably affixed end support means is in its non-supporting position.

5. The dolly of claim 1 wherein there is further included:

at least one moveable locking and support member located at least towards the ends of said platform structures on one side of said central support member, said locking and support member being positionable in at least a generally vertical direction in supporting engagement between said platform structures when the dolly is in its inclined disposition.

6. The dolly of claim 1 wherein there is further included:

locking member means at least temporarily attachable to said, upper, load platform structure for locking said dolly in its inclined disposition; and
   separable bridge member means attachable at one end to and supportable by said upper, load platform structure at least near the end structure of said upper, load platform structure for supporting a load to be transferred from said upper load platform structure to another surface, for example stairs, removed from the upper, support surface of said upper, load platform structure.

7. The dolly of claim 6 wherein said end structure of said upper, load platform structure includes a horizontal, laterally disposed bar and said end of said bridge member means includes inverted trough means for interlocking with said bar for attaching and supporting said bridge member means to and on said upper, load platform structure.

8. The method of changing the angular disposition of a load when desired during a move, such as for example when it is desired to change the effective horizontal dimension of the load, comprising the following steps:

a. providing a collapsible dolly for transporting the load comprising:
   a first, bottom platform structure;

a number of caster wheels upon which said first platform structure is mounted, said caster wheels being disposed across the bottom thereof;

a central support member mounted on said first platform structure and extending upwardly therefrom; and a second upper, load platform structure pivotally mounted on said central support member above and removed from said bottom platform structure;

a first end support means located on one side of said central support member for supporting one end of said upper load platform structure on said bottom platform structure; and a second end support means located on the other side of said central support member for supporting the other end of said upper, load platform structure on said bottom platform structure; at least one of said end support means being moveably affixed to one of said platform structures allowing the end support means to be moved from an at least generally vertical, supporting disposition to a non-supporting position; whereby a load mounted on the dolly can be easily changed from an at least generally horizontal to an inclined disposition or vice versa by rotating the load platform structure about the central support.

b. mounting the load on said load platform of said dolly; and c. moving the moveably affixed end support means from one disposition or position to the other; and d. rotating said load platform structure about said central support to thereby change the angular disposition of the load.

9. The method of claim 8 wherein in step a said moveably affixed end support means is hingedly attached; and in step c said moveably affixed end support means is moved about its hinge attachment.

10. The method of claim 9 wherein in step a an abutment stop is provided on the upper side of said bottom platform structure on the central side of said moveably affixed end support means, and elastic means are provided in association with said moveably affixed end support means for biasing it toward said stop; and wherein in step c, in moving said moveably affixed end support means from its non-supporting position to its support disposition, said elastic means pulls it toward and against said support to at least a generally vertical disposition.

* * * * *